United States Patent Office 2,833,739
Patented May 6, 1958

2,833,739

VINYL CHLORIDE POLYMER PLASTICIZER WITH ADDUCTS OF FUMARATES AND ALKYLENE ESTERS OF LONG CHAIN FATTY ACIDS

Joachim Dazzi, Dayton, Ohio, assignor to Monsanto Chemical Company, St. Louis, Mo., a corporation of Delaware No Drawing. Original application August 28, 1950, Serial No. 181,947, now Patent No. 2,782,227, dated February 19, 1957. Divided and this application October 12, 1956, Serial No. 615,457

5 Claims. (Cl. 260—31.8)

The present invention relates to resinous compositions and more particularly with plasticized vinyl chloride polymers.

I have found that particularly valuable as plasticizers for vinyl chloride polymers are polycarboxylates having the general formula:

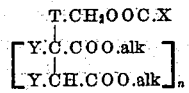

in which T is an alkenyl radical of from 9 to 23 carbon atoms, Y is selected from the class consisting of hydrogen and the methyl radical, alk is an alkyl radical of from 1 to 6 carbon atoms, X is selected from the class consisting of alk and the radical—CY:CY.COO.alk, and $n$ is a number of from 1 to 3.

Polycarboxylates of the above formula may be obtained by the addition reaction of an ester of a long-chain alkenol with an α,β-olefinic dicarboxylic anhydride and esterification of the resulting addition product or by the addition reaction of said alkenol with a dialkyl ester of an acyclic α,β-olefinic dicarboxylic acid.

Esters of long-chained alkenols which are employed for the preparation of the present polycarboxylic compounds have the general formula T.CH$_2$.OOC.Z in which T is an alkenyl radical of from 9 to 23 carbon atoms and Z is selected from the class consisting of alkyl radicals of from 1 to 6 carbon atoms and the radical —CY:CYCOO.alkyl. As illustrative of esters having this general formula may be mentioned undecenyl and oleyl acetate, propionate, butyrate, isobutyrate, n-valerate, isovalerate, n-hexoate, fumarate, maleate, citraconate, etc.

Acyclic α,β-olefinic dicarboxylic esters which add with the above long-chained alkenyl esters to yield the present polycarboxylic compounds have the formula:

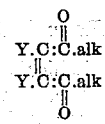

in which Y is selected from the class consisting of hydrogen and the methyl radical and alk denotes an alkyl radical of from 1 to 6 carbon atoms. This includes, for example, dimethyl, dibutyl or dihexyl maleate; diethyl, dibutyl or diamyl fumarate; dimethyl, diisopropyl or dipropyl citraconate; mono-methyl maleate, mono-ethyl fumarate, mono-ethyl citraconate, etc.

Useful polycarboxylates may be prepared by the addition reaction of the higher alkenyl esters with maleic anhydride and subsequent esterification, thus:

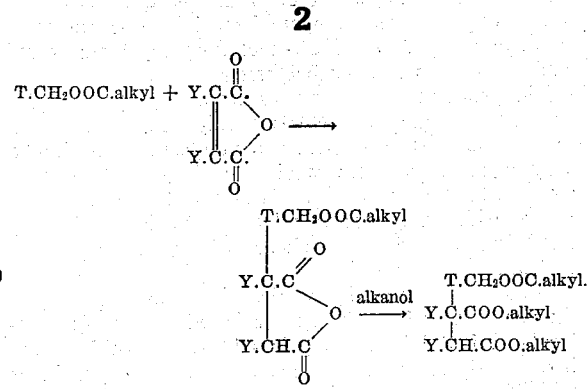

When employing, instead of the anhydrides, the corresponding alkyl esters thereof, there is not only an addition of the higher alkenyl ester to the double bond of the dicarboxylic component, but there may also result a cross-esterification, substantially according to the scheme:

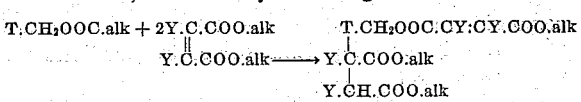

where T is an alkenyl radical of from 9 to 23 carbon atoms, Y is hydrogen or methyl and alk denotes a lower alkyl radical.

Here there probably occurs an ester interchange:

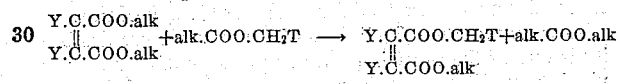

and the mixed dicarboxylate thus obtained further reacts as follows:

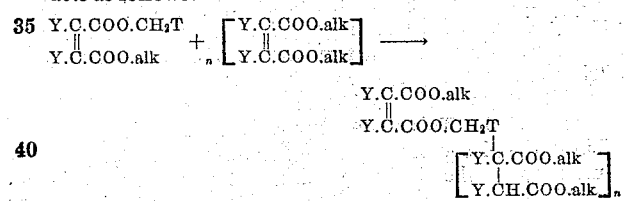

in which $n$ is a number of from 1 to 3.

The formation of 1:1, 1:2 or 1:3 oleyl ester-dicarboxylate adducts is a function of reactant proportions, of heating time and temperature and catalyst. Employing equimolar quantities of the reactants, or an excess of the oleyl ester, ester-interchange results. With about two moles of the dicarboxylate, the product is generally a 1:1 adduct. With such an excess of the dicarboxylic compound, short heating, say, for from a few hours to ten hours at temperatures of from, say, 200° C. to 220° C., generally results in the formation of a preponderance of the 1:1 adduct. With longer heating time, say, a heating time of from 10 to 48 hours a preponderance of the higher ratio adducts are formed. The higher ratio adducts are also formed in preponderant quantities when employing a shorter heating time, but in this case higher temperatures are required, i. e., temperatures of from, say, 220° C. to 280° C., depending upon the reactivities and decomposition points of the reactants.

Because of uncertainty concerning the position at which the dicarboxylic residue is attached to the alkenyl ester, the presently useful adducts will be hereinafter referred to without stipulating the position of the introduced carboxy groups. For convenience, however, when dealing with adducts prepared from, e. g., maleic anhydride or fumaric or maleic acid esters, the introduced dicarboxy residue will be designated as the 1',2'-dicarboxyethyl group and the products obtained with a higher alkenyl ester such as oleyl acetate will be referred to, e. g., as (1',2'-dicarboxyethyl)octadecenyl acetate, its anhydride, or esters of the same in the case of the simple, 1:1 addition products. In the case of the cross-esterified, 1:1 addition products, the compounds will be referred to as mono-alkyl, mono - (1',2' - dicarboxyethyl)octadecenyl maleates or fumarates or their esters.

The present polycarboxylates are of outstanding value as plasticizers for vinyl chloride polymers, imparting simultaneously a high degree of low temperature flexibility, very good temperature stability and good mechanical strength to these polymers. The present esters are compatible with vinyl chloride polymers and show no exudation of plasticizer even at plasticizer content of up to 50 percent.

Although the quantity of plasticizer will depend upon the particular polymer to be plasticized and upon its molecular weight, it is generally found that compositions having from 5 percent to 50 percent by weight of plasticizer will, in most cases, be satisfactory for general utility. The good flexibility of the plasticized compositions increases with increasing plasticizer concentration.

In evaluating plasticizer efficiency use is made of the following empirical testing procedures:

*Compatibility.*—Visual inspection of the plasticized composition is employed, incompatibility of the plasticizer with the polymer being demonstrated by cloudiness and exudation of the plasticizer.

*Hardness.*—A standard instrument made by the Shore Instrument Company is used for this determination and expresses the hardness in units from 1 to 100. The hardness of the composition is judged by its resistance to the penetration of a standard needle applied to the composition under a standard load for a standard length of time.

*Low temperature flexibility.*—Low temperature flexibility is one of the most important properties of elastomeric vinyl compositions. While many plasticizers will produce flexible compositions at room temperature the flexibility of these compositions at low temperatures may vary considerably, i. e., plasticized polyvinyl chloride compositions that are flexible at room temperature often become very brittle and useless at low temperatures. Low temperature flexibility tests herein employed are according to the Clash-Berg method. This method determines the torsional flexibility of a plastic at various temperatures. The temperature at which the vinyl composition exhibits an arbitrarily established minimum flexibility is defined as the low temperature flexibility of the composition. This value may also be defined as the lower temperature limit of the plasticized compositions usefulness as an elastomer.

*Volatility.*—Just as a decrease in low temperature often results in decreased flexibility of a plasticized polymer composition so does a decrease in plasticizer concentration when caused by volatilization of the plasticizer. Hence, plasticizers which are readily volatilized from the plasticized composition as a result of aging or heating are inefficient because upon volatilization the plasticized compositions become stiff and hard. The test for plasticizer volatility herein employed is that described by the American Society for Testing Materials under the designation D–744–44T.

*Water resistance.*—The amount of water absorption and the amount of leaching that takes place when the plasticized composition is immersed in distilled water for 24 hours is determined.

The invention is further illustrated, but not limited, by the following examples:

*Example 1*

A mixture consisting of 310.5 g. (1 mole) of oleyl acetate, 122.5 g. (1.25 mole) of maleic anhydride and 1.55 ml. of triphenyl phosphite was brought to a temperature of 115° C., and then during a period of 5 hours, in a nitrogen atmosphere, and under reflux, the mixture was stirred at a temperature of from 198° C. to 220° C. The latter temperature did not reach 220° C. until the last hour of heating. The reaction mixture was treated with 7.5 g. of clay and 2.5 g. of a filter aid for 30 minutes and then with 3.5 g. of charcoal. After filtering and washing the residue the filtrate and the washings were combined, dried, and vacuum distilled to remove material boiling up to 210° C./1.0–1.5 mm. The residue (173 g., $n_D^{25}$ 1.4779), comprising the anhydride of substantially pure (1',2'-dicarboxyethyl)octadecenyl acetate had a saponification equivalent of 133.5 (calcd. 139.3).

Conversion of this anhydride to the dibutyl ester of (1',2'-dicarboxyethyl)octadecenyl acetate was effected as follows: A mixture consisting of 122.4 g. (0.3 mole) of the anhydride, 0.9 mole of n-butanol, 50 g. of benzene, and 5 ml. of 96% sulfuric acid was stirred for 7 hours, during which time, 9.0 cc. of water was collected by means of the Dean-Stark type water-trap with which the reaction vessel was equipped. The reaction mixture was washed with 700 ml. of water, treated with 50 ml. of 5% aqueous sodium bicarbonate and then washed to neutral. Vacuum distillation was employed to remove low boiling material and subsequent fractionation gave the substantially pure dibutyl (1',2'-dicarboxyethyl)octadecenyl acetate, B. P. 240° C./0.6–0.9 mm., $n_D^{25}$ 1.4610.

*Example 2*

A mixture consisting of 124.2 g. (0.4 mole) of oleyl acetate and 1.0 mole of diethyl fumarate was charged to a vessel which was equipped with a Vigreux column and a Dean-Stark type trap fitted with a condenser; and the mixture was refluxed for about 14 hours. During this period 32.6 g. of a low boiling liquid, B. P. 70–90° C., $n_D^{25}$ 1.3842 (mostly ethyl acetate) was collected in the trap. An additional 0.4 mole of diethyl fumarate was then added to the reaction vessel, and the reaction mixture was again refluxed for 30 hours at a temperature of 230° C. to 245° C. There was thus collected an additional 6.3 g. of low-boiling material. Distillation of the product removed 67.4 g. of diethyl fumarate and gave as residue 245.5 g. of a material, which while bubbling nitrogen through it, boiled above an oil-bath temperature of 220° C. to 230° C./0.3 mm., had a saponification equivalent of 136.1, $n_D^{25}$ 1.4760 and a molecular weight of 644.5. Based on the recovered diethyl fumarate, 2.52 moles of diethyl fumarate have reacted, one mole of which participated in the cross-esterification and 1.52 moles of which added to the oleyl radical. Accordingly, the present product is mono-ethyl mono-oleyl fumarate in which some of the hydrogens of the oleyl radical has been substituted by bis(1',2'-carboethoxy)ethyl radicals. The calculated molecular weight of mono-ethyl mono-oleyl fumarate having 1.52 of the bis(1',2'-carboethoxy)ethyl radicals is 656.7; found, 644.5 by molecular weight determination in benzene; calcd. saponification equivalent 131.3; found, 136.1; and the found free acid content of the 1.52 adduct is 1.06%.

*Example 3*

Sixty parts of polyvinyl chloride and 40 parts by weight of the butyl ester of Example 1 were mixed on a rolling mill to a homogeneous blend. During the milling there was observed substantially no fuming and discoloration. A molded sheet of the mixture was clear and transparent and substantially colorless. Testing of the molded sheet for low temperature flexibility, according to the testing procedure described above, gave a value of minus 43° C. which value denotes good low temperature properties. Tests on the volatility characteristics of the plasticized composition gave a value of 2.98 percent. The plasticized material had a hardness of 78 before the volatility test and a hardness of 78 after the volatility test. When subjected to heat at a temperature of 325° F. for a period of 30 minutes the clarity and color of the molded product were substantially unchanged. Tests of the water-resistance properties of the plasticized material employing the test procedure described above showed a solids-loss of only 0.13 percent and an 0.45 percent water absorption value.

*Example 4*

Employing the evaluation procedure of Example 3, the ester of Example 2 was tested as a plasticizer for polyvinyl chloride. The low temperature flexibility value thus obtained was minus 0.5° C., and the volatility value was 0.45 percent, which value denotes extremely good volatility properties. The plasticized material had a hardness of 92 before the volatility test and a hardness of 92 after the volatility test. Water-resistance tests gave a solids-loss value of only 0.03 percent and an 0.35 percent water absorption value.

Instead of the esters employed in the above examples, other esters obtained by the reaction of alkenyl esters with the present acyclic dicarboxylates give similarly valuable plasticized polyvinyl chloride compositions. Thus, by employing 40 parts by weight of the diethyl or dihyexyl (1',2'-dicarboxyethyl)oleyl butyrate, the diisoamyl or dimethyl (1',2'-dicarboxyethyl)undecenyl n-hexoate or the cross-esterified addition products obtained by reaction of undecenyl acetate with dihexyl fumarate or diethyl citraconate, with 60 parts of polyvinyl chloride or with 60 parts by weight of a vinyl chloride-vinyl acetate copolymer known to the trade as "Vinylite," there are obtained clear, colorless, compositions of very good flexibility and stability.

While the above examples show only compositions in which the ratio of plasticizer to polymer content is 40:60, this ratio being employed in order to illustrate comparable efficiencies, the content of ester to polyvinyl chloride may be widely varied, depending upon the properties desired in the final product. For many purposes a plasticizer content of, say, from only 10 percent to 20 percent is preferred. The present esters are compatible with polyvinyl chloride over wide ranges of concentrations, up to 50 percent of esters based on the total weight of the plasticized composition yielding desirable products.

Although the invention has been described particularly with reference to the use of the present esters as plasticizers for polyvinyl chloride, these esters are advantageously employed also as plasticizers for copolymers of vinyl chloride, for example, the copolymers of vinyl chloride with vinyl acetate, vinylidene chloride, methyl methacrylate, acrylonitrile, etc. Preferably, such copolymers have a high vinyl chloride content, i. e., a vinyl chloride content of at least 70 percent by weight of vinyl chloride and up to 30 percent by weight of the copolymerizable monomer.

The plasticized polyvinyl halide compositions of the present invention have good thermal stability; however, for many purposes it may be advantageous to use known stabilizers in the plasticized compositions. Inasmuch as the present esters are substantially unreactive with the commercially available heat and light stabilizers which are commonly employed with polyvinyl chloride or copolymers thereof, the presence of such materials in the plasticized products does not impair the valuable properties of the present esters. The present esters are of general utility in softening vinyl chloride polymers. They may be used as the only plasticizing component in a compounded vinyl chloride polymer or they may be used in conjunction with other plasticizers.

This application is a division of my application Serial No. 181,947, filed August 28, 1950, now Patent No. 2,782,227.

What I claim is:

1. A resinous composition comprising a vinyl chloride polymer plasticized with a polycarboxylate having the general formula:

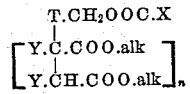

in which T is an alkenyl radical of from 9 to 23 carbon atoms, Y is selected from the class consisting of hydrogen and the methyl radical, alk is an alkyl radical of from 1 to 6 carbon atoms, X is selected from the class consisting of alk and the radical —CY:CY.COO.alk, and $n$ is a number of from 1 to 3.

2. A resinous composition comprising polyvinyl chloride plasticized with a polycarboxylate having the general formula:

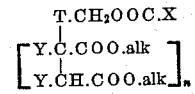

in which T is an alkenyl radical of from 9 to 23 carbon atoms, Y is selected from the class consisting of hydrogen and the methyl radical, alk is an alkyl radical of from 1 to 6 carbon atoms and X is selected from the class consisting of alk and the radical —CY:CY.COO.alk, and $n$ is a number of from 1 to 3.

3. A resinous composition comprising a copolymer of at least 70 percent by weight of vinyl chloride and up to 30 percent by weight of an unsaturated monomer copolymerizable therewith, said copolymer being plasticized with a polycarboxylate having the general formula:

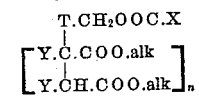

in which T is an alkenyl radical of from 9 to 23 carbon atoms, Y is selected from the class consisting of hydrogen and the methyl radical, alk is an alkyl radical of from 1 to 6 carbon atoms, X is selected from the class consisting of alk and the radical —CY:CY.COO.alk, and $n$ is a number of from 1 to 3.

4. A resinous composition comprising polyvinyl chloride plasticized with dibutyl (1',2'-dicarboxyethyl)-octadecenyl acetate.

5. A resinous composition comprising polyvinyl chloride plasticized with mono-ethyl mono-oleyl fumarate in which from 1 to 3 hydrogen atoms of the oleyl radical are substituted by a (1',2'-dicarboethoxy)ethyl radical.

No references cited.